United States Patent [19]

Moriyama et al.

[11] Patent Number: 4,602,295

[45] Date of Patent: Jul. 22, 1986

[54] RECORDING AND REPRODUCING METHOD FOR VIDEO FORMAT SIGNAL

[75] Inventors: Yoshiaki Moriyama; Toshio Gotoh; Hideki Hayashi, all of Saitama, Japan

[73] Assignee: Pioneer Electronic Corporation, Tokyo, Japan

[21] Appl. No.: 544,910

[22] Filed: Oct. 24, 1983

[30] Foreign Application Priority Data

Oct. 23, 1982 [JP] Japan ................... 57-186565
Oct. 23, 1982 [JP] Japan ................... 57-186566
Oct. 23, 1982 [JP] Japan ................... 57-186567

[51] Int. Cl.$^4$ .............................. H04N 5/91
[52] U.S. Cl. ...................................... 358/343
[58] Field of Search ............... 358/343, 143, 144, 145; 360/19.1

[56] References Cited

U.S. PATENT DOCUMENTS

| 3,991,265 | 11/1976 | Fukuda et al. | 360/19.1 |
| 4,065,795 | 12/1977 | Shutterly | 360/19.1 |
| 4,246,615 | 1/1981 | Shiraishi et al. | 360/19.1 |
| 4,390,906 | 6/1983 | Furumoto et al. | 360/19.1 |
| 4,450,488 | 5/1984 | Golding | 360/19.1 |
| 4,468,710 | 8/1984 | Hashimoto et al. | 360/19.1 |

Primary Examiner—Donald McElheny, Jr.
Attorney, Agent, or Firm—Sughrue, Mion, Zinn, Macpeak, and Seas

[57] ABSTRACT

A method for recording and reproducing video and accompanying audio information whereby various reproduction modes are made possible, including displaying a still image with appropriate sound, without adversely affecting the quality of the played-back signals. A video format signal, containing two-dimensional image information, is divided into a plurality of blocks. Audio information is inserted into predetermined ones of these blocks, and video information is inserted in the remaining blocks. The video format signal is recorded in this form on a magnetic medium. Upon reproduction, the blocks into which the audio information was inserted are, for video reproduction, either masked or replaced with other video information. Control information, including information correlating the audio and video information and, preferably, error correcting code information, is also recorded.

10 Claims, 29 Drawing Figures

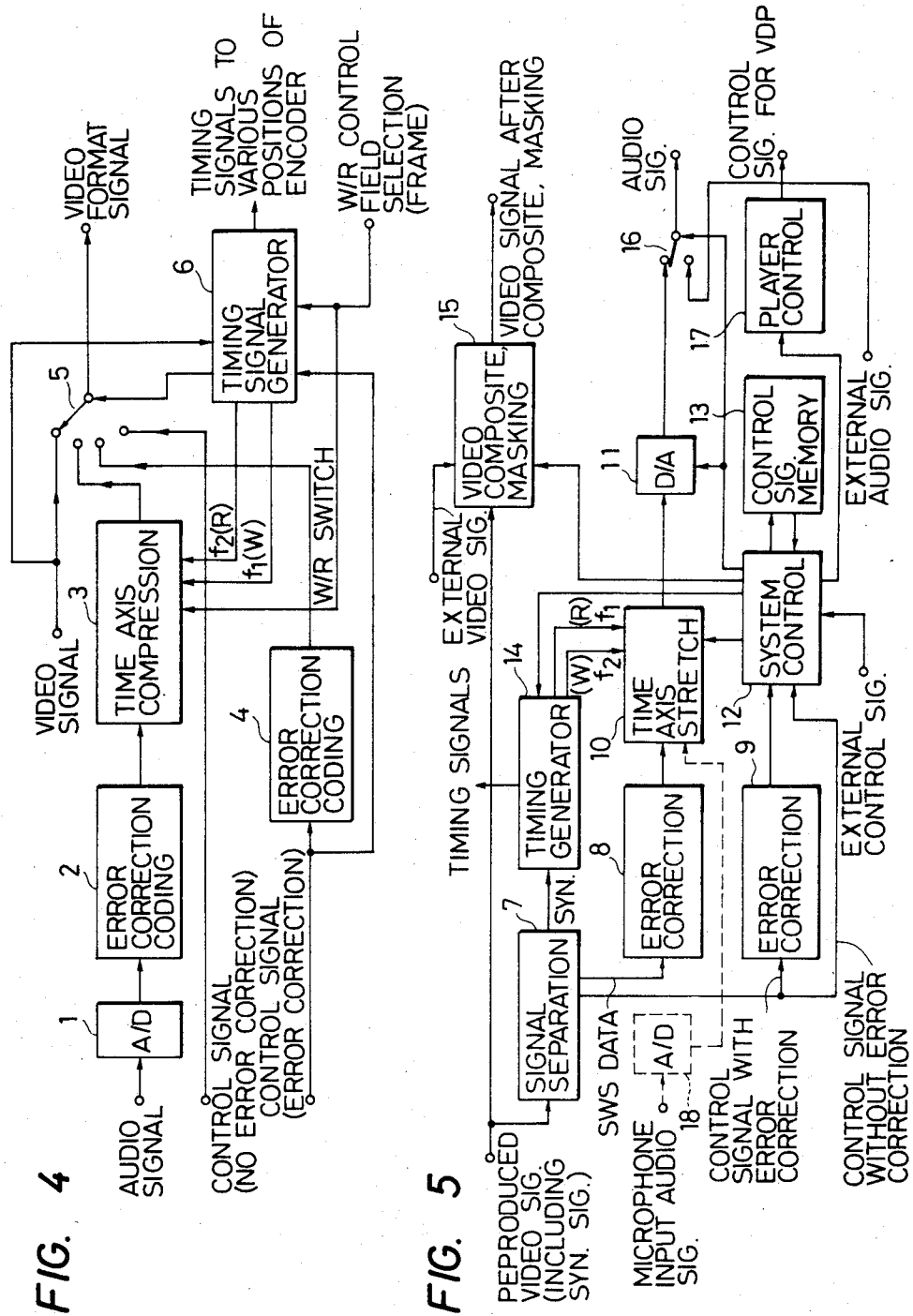

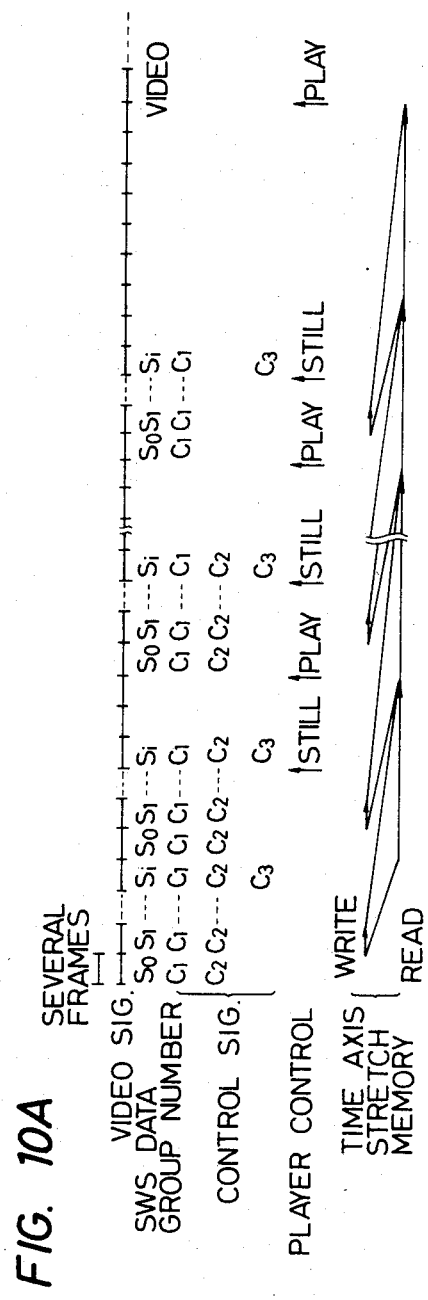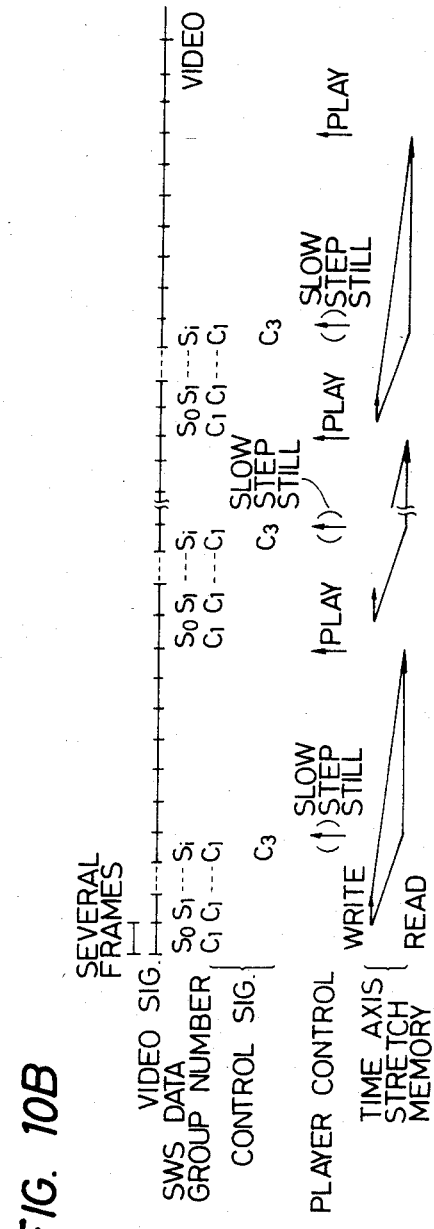

FIG. 13A INFOR. WAVEFORM $C_i = A_i + B_i \ (i = 0 \cdots n)$

RECORDING AND REPRODUCING METHOD FOR VIDEO FORMAT SIGNAL

BACKGROUND OF THE INVENTION

The present invention relates to a recording and reproducing method for video format signal and, particularly, to such system in which video information, as well as audio information, is recorded on a common recording track of a recording medium as a video format signal and is reproduced therefrom.

In recording video information and accompanying audio information on a common track of a recording medium, a system has been known in which the audio information is time-compressed and inserted into a portion of a video format signal while the video information occupies the remaining portion of the video format signal.

In a search operation with video reproduction apparatus such as video disc player (VDP) employing such a system, the pattern of the audio/video information within the video format signal is fixed, and thus it is impossible to obtain various desired types of motion upon reproduction such as still frame reproduction with accompanying audio.

That is, a desired video format signal is searched and a reproduction of the audio and video information may be performed by shifting a stationary image reproduction operation to the usual reproduction operation. Further, since it is usual for the audio information to be inserted into the first several frames of the video format signal, when a first frame containing audio information is searched and a stationary image is reproduced thereby, the reproduction of the audio information may be adversely affected.

An object of the present invention is thus to provide a recording and reproducing system in which various reproduction modes of the video information become possible.

Another object of the present invention is to provide a search system for recorded information in which, while a search operation and an image on a monitoring TV display during the search operation are conventional, stable reproduction of audio information is possible without adversely affecting the quality of the reproduced audio information.

SUMMARY OF THE INVENTION

Achieving the above and other objects, in a recording and reproducing system constructed according to the present invention, a two-dimensional image plane obtainable from a signal corresponding to a single field (frame) of the video format signal is divided into a plurality of blocks and audio information and video information are inserted into predetermined ones of these blocks and the remaining blocks.

During reproduction, the blocks containing the audio information are replaced by other video information from, for example, a computer. Control information is also inserted, together with the video information, into the remaining blocks. The control information contains at least information indicative of the blocks into which the audio information is inserted, so that locations into which the audio information corresponding to the video information is inserted can be determined.

The audio information is time compressed for recording, while for reproduction, audio information is time expanded using memories and associated components to obtain a real-time reproduction. The signal thus reproduced can be used as an audio accompaniment for animation or "trick" play (still, slow, step etc.) of the reproduced image.

The audio information is digitized for recording. In order to make error detection and error correction possible in the respective blocks, redundancy bits for error correction are added to thereby improve the reliability of the reproduced information. By making error detection and error correction possible in the respective audio information blocks, it is possible to arbitrarily set the length of the audio information for one field, that is, audio information length in a real-time block.

This means that, for a reproduced image containing audio information, the speed at which the reproduced image is played back can be arbitrarily set when audio information is continuously output while frames are reproduced sequentially at time periods equal to the lengths of audio information for respective fields (frames). Further, it is possible to insert audio information into arbitrary locations of the image, desirably, to locations which are not important portions of the recorded image.

By searching the portions of the reproduced image which correspond to the locations into which the audio information is inserted while clamping the reproduced video signal at a constant level, such as the "pedestal" level or the average image level (APL), or by replacing the image information by other image information from, for example, a computer, and by stopping the replacement or clamping operation when the search operation, started at a frame portion of a preceding block, reaches a frame portion of a desired block, adverse influences on the appearance of the reproduced image are prevented.

Further, by providing a decoder for reading out the control information and the audio information, it becomes possible to precisely control the operation of the reproducing device (video disc player etc.). This is equivalent to preliminarily storing an operating routine (software) for the reproducing device on the recording medium which is used for carrying out various controls for the reproducing operation without providing special circuitry on the reproducing side.

BRIEF DESCRIPTION OF THE DRAWINGS

FIG. 4 is a block diagram of an encoder for performing recording in accordance with the present invention;

FIG. 5 is a block diagram of a decoder for performing reproducing in accordance with the present invention;

FIGS. 10A and 10B are graphs showing relations between SWS data, control information and a reproducing operation;

FIGS. 13A and 13B show a modulation system for control information;

FIG. 14 is a bit pattern diagram for explaining a coding of error correction of control information;

DESCRIPTION OF THE PREFERRED EMBODIMENTS

Figure 1:
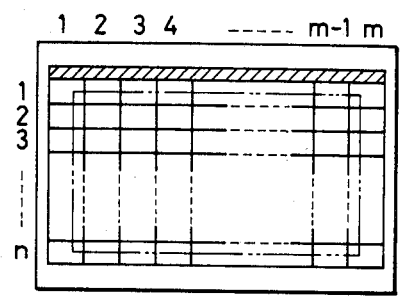
FIG. 1 is a diagram used for explaining an operating of the present invention.

FIG. 1 is a diagram useful for explaining the principles of the present invention. Specifically, FIG. 1 shows a two-dimensional image plane obtained from a signal corresponding to one field (frame) of a video formation signal to be recorded. In FIG. 1, vertical and horizontal edge portions correspond to vertical and horizontal blanking portions, respectively, and a rectangular portion surrounded by a chain line corresponds to an image actually displayed on a monitor TV set. An upper hatched portion of an area surrounded by the vertical and horizontal blanking portions, which corresponds to several horizontal scanning periods (H), is assigned as a control signal insertion block. The remaining portion of the area is divided into m×n blocks as shown. Control signals assign blocks into which time-compressed audio information is inserted so that locations in the image plane into which audio information is inserted are determined. It is of course possible, alternatively, to assign the locations into which video information is inserted and the size thereof to thereby determine blocks into which audio information is to be inserted.

Figure 2:
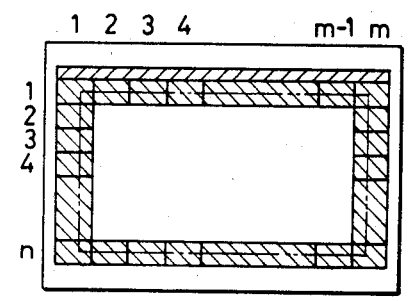
FIG. 2 shows a reproduced image pattern produced using an embodiment of the present invention.

FIG. 2 illustrates an example of insertion of audio information. In FIG. 2, the audio information is inserted into an oppositely hatched block having the form of a rectangular ring, while the video information is inserted into a block surrounded by the rectangular ring. Thus, a portion of the rectangular ring block into which the audio information is inserted appears in the monitor image plane surrounded by the chain line. That portion may be clamped at a constant level or replaced by other external video information in the reproduction apparatus.

Figure 3A:
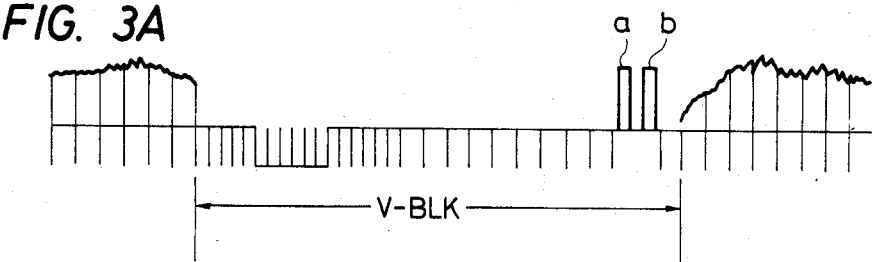
FIGS. 3A and a 3B show a video format signal waveform according to the present invention.
Figure 3B:
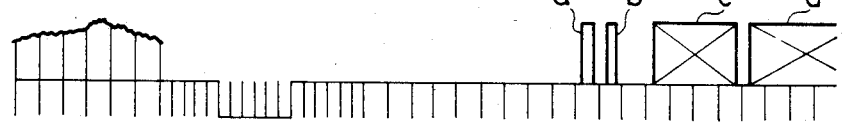

FIGS. 3A and 3B show a video format signal waveform for recording using the NTSC system. It should be noted that other systems such as PAL may be used. FIG. 3A shows the waveform prior to insertion of audio information, and FIG. 3B shows the same after insertion. In FIGS. 3A and 3B, letters a and b depict test signals, such as color bars or the like, c indicates control information, and d the audio information. Although, in FIG. 3B, there is no information inserted into vertical blanking (V-BLK) intervals, the control information and the audio information may be inserted thereinto, alternatively to FIG. 3B.

At least portions of the control information which relate to the location into which the audio information is inserted and to the image processing method should be inserted into a predetermined portion of a location preceding a corresponding image.

In a case where the audio information is recorded through several frames, the control information is preferably inserted into a predetermined portion of a first frame, although it may be inserted into any frame other than the first frame.

FIG. 4 is a block diagram of an encoder used for providing the video format signal according to the present recording system. An analog audio signal is digitized with a nonlinear analog-to-digital (A/D) converter 1 operating according to a modulation system such as adaptive delta modulation (ADM) or adaptive differential pulse code modulation (ADPCM) which provides a high compression effect. The resulting digital signal is supplied to an error correction coding circuit 2 in which it is interleaved to distribute any digital signal error which may be caused by signal dropout due to defects or dust on the recording disc. A redundancy bit, used as an error correction code, is added to each block. The signal thus processed is written in a time-axis compression memory 3 with a sampling frequency $f_1$. By reading out the signal from the memory 3 with a frequency $f_2$ higher than $f_1$, the signal is time compressed.

The control signals bearing the control information may be classified into one which is used to detect errors and corrects it on the reproduction side and one which does not detect and correct errors. The former control signal includes information concerning the block number corresponding to a block into which the audio information is inserted, the sampling frequency, channel number (monaural or stereo etc.) of the audio information, a reproducing operation of the video disc player including an address number for search, reproduction of the audio information (continous or non-continuous), and a group number of grouped blocks into which the audio information is inserted. This control signal is supplied to an error correction coding circuit 4.

The control signal should be recorded using an error correcting code. The error corecting code used for the control signal should be more powerful than that used for the audio information because the control information is of course more critical for accurate system operation.

Further, signals such as flags indicating the existence or absence of audio information in the individual fields (frame) or Philips codes (which are stop codes) by which reproduction is automatically switched to still mode reproduction, are supplied directly to a switching circuit 5. Output signals of the time compression memory 3 and the error correction coding circuit 4 and an image signal including synchronizing signals are also supplied to the switching circuit 5. The latter circuit selects one of these signals under the control of a timing signal generator 6 which also controls the read in and read out of the memory 3.

An internal oscillator of the timing signal generator 6 is made synchrous with the synchronizing signal of the image signal supplied directly thereto for generating various timing signals in response to an external control signal, thereby to obtain a video format signal having desired blocks into which the time-compressed audio information is inserted and remaining blocks into which the video information is inserted (at the output of the switch circuit 5).

FIG. 5 shows a block diagram of a decoder used for reproducing the video format signal thus obtained and recorded on a video disc.

In FIG. 5, the reproduced video signal, including the synchronizing signal, is supplied to a signal separator 7 and to a video synthesizing masking circuit 15. In the signal separator 7, the audio information and the control information are separated from the reproduced signal and supplied to error correction circuits 8 and 9, so that errors included in these signals can be corrected thereby. Thereafter, the audio information, that is, the still picture with sound (SWS) data, is written into a time-expansion memory 10 at a high frequency $f_2$. Reading out thereof is performed with a clock of sampling frequency $f_1$ to provide a real-time audio data. Then it is demodulated by a digital-to analog (D/A) converter 11. In this case, the error correction may be performed at the same time as the time expansion during the reading out thereof from the memory 10.

Control signals in which errors have been corrected and control signals in which errors have not been corrected are inputted to a system control circuit 12. The circuit 12 controls the entire decoder system in response to the control signal separated from the reproduced signal and the external control signal, and also controls the video disc player. Since the read out of the audio information from the memory 10 is not always performed immediately after the writing in thereof, it is necessary to store the control signal is used for read-out operation. A control signal memory 13 performs this function. A timing signal generator 14, including an internal oscillator operable in synchronism with the synchronizing signal separated from the reproduced signal in the signal separation circuit 7, functions to generate various timing signals according to control signals from the system controller 12. These timing signals are supplied to respective blocks of the decoder.

The blocks of the video format signal into which the audio information is inserted may be filled with other video signals obtained from a computer etc. or clamped at a constant level such as pedestal level (or APL) in a video synthesizing (or masking) circuit 15.

An external audio signal such as an FM two-channel audio signal obtained from the video disc player may be selectable as an audio signal output when there is no audio information or when a switch 16 is suitably set.

The system control circuit 12 provides a control signal for controlling the reproduction operations of the video disc player, which control signal is included in the reproduced control signal and which is supplied through a player controller 17 to the video disc player.

An A/D converter 18 and associated circuit (shown by dotted lines) may be necessary if the decoder has the so-called IL (language laboratory) function. In such a case, a voice input of a student is supplied through a microphone to the A/D converter 18 in which it is digitized, and then the digital information is written in the time expansion memory 10. That is, the memory 10 functions as a tape recorder. The memory 10 is read out at the frequency $f_1$ for use in writing into the memory 3 and reading out from the memory 10 in FIGS. 4 and 5, respectively, according to the content of the audio information. According to the sampling theory, the sampling frequency required is at least twice as high as the information content of the signal to be recorded. Thus if the audio information contains music, a high sampling frequency is required since such sound has a wide frequency range. On the other hand, for the human voice, the sampling frequency may be much lower. Therefore, it is advisable to add sampling frequency selection information to the control information to thereby effect switching of the sampling frequency between different values according to the type of audio information. It is further advisable to add channel number selection information to the control information so that it is possible to select between a monaural (single channel) mode for human voice or a stereo (two channels) mode for music.

Figure 6A:
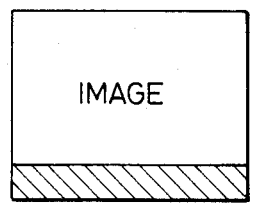
FIGS. 6A–6C show an example of reproduced image pattern processing according to the present invention.
Figure 6B:
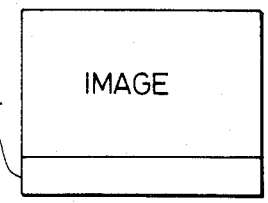
Figure 6C:

FIGS. 6A–6C illustrate the processing of the reproduced image, in which FIG. 6A depicts in the reproduced image a hatched portion in which the audio information is inserted. The reproduced image of FIG. 6A is processed by the video synthesizing (or masking) circuit 15 of the decoder of FIG. 5 to form an image as shown in FIG. 6B or 6C. The image of FIG. 6B has the audio information containing blocks replaced by an externally supplied image and the image of FIG. 6C has the blocks replaced by a constant level, such as the pedestal level.

The image format of FIG. 6B is useful when the system is used for educational purpose since with such an image, communication between the user and a computer becomes possible. For example, with such an image format, it is possible to provide some inquiry as an image together with audio information and to provide in the hatched area in answer to the inquiry from the computer in the form of character or image while the inquiry is displayed as it is. Further, it is possible to display in that area an instruction for a subsequent operation.

It also becomes possible to process images easily and reliably by inserting a control signal (or flag) representative of the insertion of audio information into every frame (or field) in which the audio information is inserted and by employing the appropriate control signal. That is, by detecting the control signal, it is possible to externally insert images into the blocks into which the audio information is inserted, independently of video signal conditions and/or system operation.

Figure 7A:
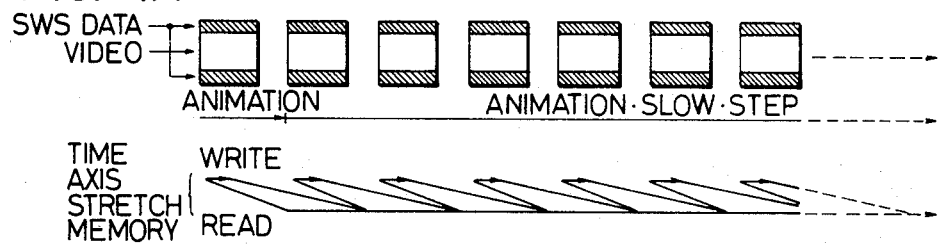
FIGS. 7A and 7B, 8 and 9 are graphs explaining reproducing operations in respective embodiments of the present invention.
Figure 7B:
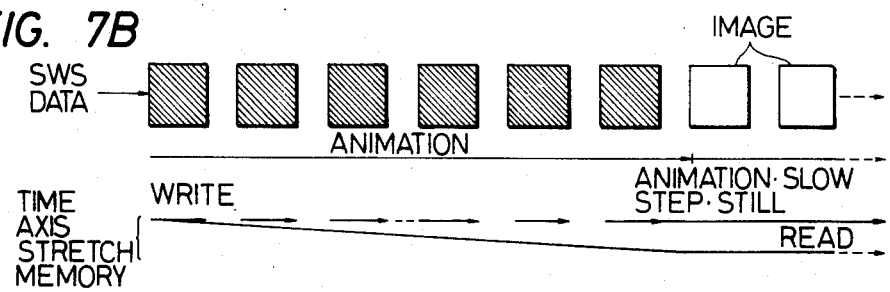

FIGS. 7A and 7B illustrate relations between the inserted audio information and the reproduced image, respectively. In the case of FIG. 7A, which corresponds to a case where the audio information in respective frames (or fields) is continuously reproduced while the reproduced images are being fed, the audio information (SWS data) is inserted into the upper and lower edge blocks of the respective frames (or fields) and recorded thereon. In reproducing such signals, the SWS data in a first frame is written in a first zone of the time expansion memory 10 (FIG. 5), and it is read out (time expanded) upon commencement of reproduction of a second frame. At this time, SWS data in the second frame is written in a second zone of the memory 10. It is read out (time expanded) subsequent to completion of the readout of the SWS data in the first frame, after which reproduction of a third frame is commenced.

These operations are repeated successively so that the audio information is continuously outputted on a real-time basis while a corresponding image is being reproduced. Since, in this case, the first frame of the reproduced image is animation and the image is sent for a time period equal to lengths of individual SWS data for the respective second and subsequent frames, the usual reproduction (animation), slow reproduction and step reproduction (so-called frame feeding), etc. of the image become possible. In this example, since alternative writing in and reading out for two areas of the time stretching memory 10 are performed, and because it may be possible to slightly overlap these two areas, the capacity of the memory 10 may be limited to two frames of the SWS data or less.

FIG. 7B shows another example of a signal in which SWS data is inserted into all blocks of a preceding six frames (or fields), and only video information is inserted into all of the remaining frames. For reproduction of this signal, while the video disc player is set in the reproduction mode, the SWS data in the preceding six frames is written sequentially in the time expansion memory and the audio information is read out on a real time basis from the memory from the time at which reproduction of the image in the seventh frame is commenced. In this case, animation, slow, step and still reproduction of the image are possible. In this example, since it is necessary to store all of the SWS data in six frames, the memory 10 should have a capacity larger than that of the memory used for the signal in FIG. 7A.

In a case where still reproduction is required for the signal in FIG. 7A, it is necessary to feed a plurality of identical images in step since the time of audio for each frame is short. Therefore, the number of stationary images to be recorded may be small. However, in the example of FIG. 7B, the number of stationary images to be recorded may be increased, although a larger memory is required. It should be noted that, when all of the SWS data is stored in the memory it may be possible to insert the data into only the upper and lower edge portions of the image, as in the case of FIG. 7A. Thus, various operations of the video disc player become possible depending upon the relations between the images and the method of insertion of the SWS data.

In the operations shown in FIGS. 7A and 7B, control operations for the writing and reading for the memory are different, and thus it is necessary to instruct switching from one control method to the other according to the control information. Further, for a video disc player, a different operation mode such as slow, step or still mode may be required according to the content of image. Therefore, a switching instruction between these different operation modes as well as the switching between the controls should be also included in the control information.

Figure 8:
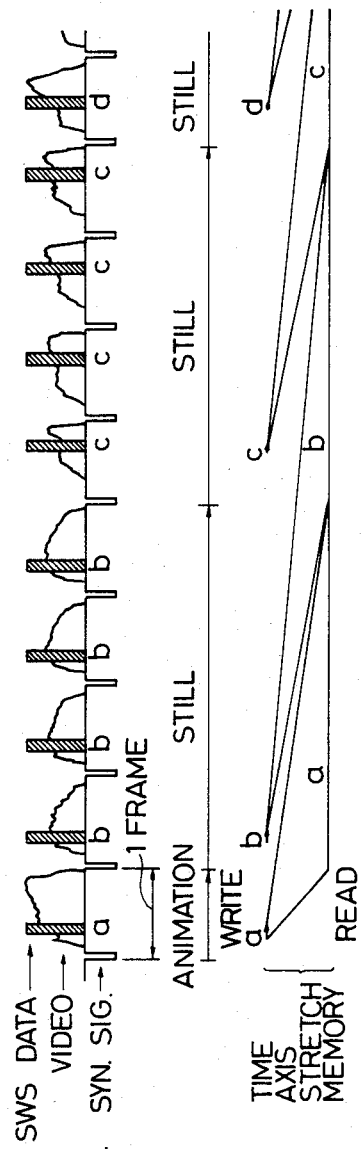

FIG. 8 shows the relation between the reproduced video signal and the inserted audio information, corresponding to the system shown in FIG. 7A. In FIG. 8, a first frame (field) is fed in the usual reproduction mode, and, for subsequent frames, the VDP is controlled such that frame feeding is performed every frame, the number of which corresponds to the SWS data for one frame. Firstly, a SWS data point a is written into the memory. Reading out of the data point a with time expanded, is started upon commencement of a subsequent reproduction of frame, that is, while a SWS data point b is being written into the memory. Upon a completion of the readout of the data point a, the data point b is read out, with time expanded, in the similar way, while a next data c is written in the portion of the memory in which the data a was stored. Thus, the data point a, b, c, d . . . are written into the memory only once. Since each of the data points corresponds to a length of an integer number of frames, the reading out of the data can be continuous if the capacity of the time stretching memory 10 is made equal to two frames of data, and thus continuous sound reproduction becomes possible.

In FIG. 8, the positions of the frames into which the data points a through b are inserted are arbitrary, and it is possible to provide continuous sound by setting the positions at which the readout of the respective data points a through d commence and the positions at which the readouts terminate as to be constant regardless of the positions of the data insertions. During this operation, an image is reproduced in the still mode for every four frames, as a result of which a frame-by-frame reproduced image is obtained.

In this case, it is impossible to discriminate between the usual reproduction and frame-by-frame reproduction with the use of only the reproduced signal. Therefore, when the decoder determines that the usual reproduction has been continued, the content of a SWS data point b, c or d may be rewritten into the memory. In order to prevent such operations from occuring, it is necessary to determine whether or not the content of the SWS data is the same as that of the preceding and subsequent frames. The control information is also used to perform this discrimination. In the case of multiple audio channels, they are multiplied in one block and the number of SWS data points in the respective channels is made to correspond to an integer number of frames (fields). This can be expressed by:

$$N_D = N_C \cdot N_f f_1 / f_F$$

where $N_D$ is the number of SWS sampling data points in one block, $N_C$ is the number of audio channels, $N_F$ is the number of frames corresponding to the SWS data points in one block, f is a sampling frequency, and $f_F$ is a frame (field) frequency.

Figure 9:
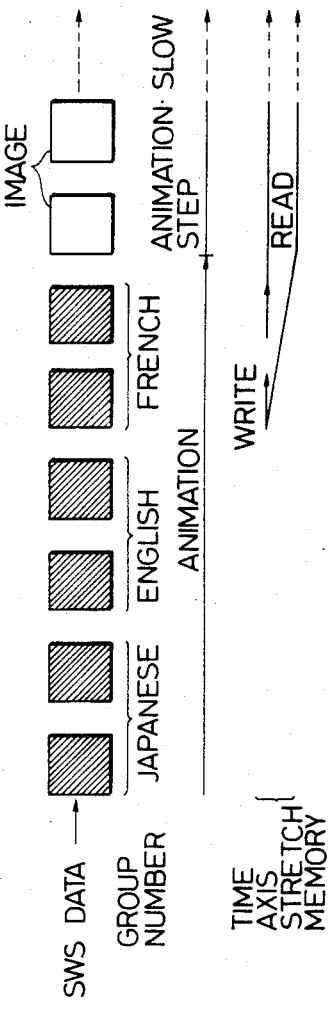

FIG. 9 shows another relation between the reproduced image and the insertion of the audio information. In this case, a block into which the audio information is inserted is further grouped and groups thus formed are assigned respective group numbers, so that a series of meaningful audio information is provided for each group. For example, a group of SWS data inserted into all of the blocks of the first and second frames (fields) is numbered as #0, into which Japanese speech is inserted. In a similar manner, a group of SWS data inserted into all of the blocks of the third and fourth frames and a group of SWS data inserted into all of blocks of the fifth and sixth frames are numbered as #1 and #2, respectively, into which English and French speech is inserted. Into subsequent frames, only video information is inserted. These group numbers are contained in one of the control information sequences to allow selective readout of the data in the respective groups by selecting a desired group number according to an instruction signal from a suitable input device as an external switch or a computer.

For example, FIG. 9 shows a case when the French speech in group #3 is selected and read out. That is, the first to sixth frames are fed for the usual reproduction, and when the data in group #3 arrives, it is written into the memory, for time expansion. The readout starts at the seventh frame. If the memory capacity is sufficient to store the data of all of the groups, it is possible to write all of the group data and to selectively read them out.

Other than the selection of language, this embodiment can be applied to a case where the video disc player provides an inquiry to a user and selectively provides comments to the user according to his answer to the inquiry. That is, this embodiment is suitable for use in educational equipment. Particularly, when this SWS system is incorporated into a bidirectional video system combined with a computer, it is very effective for educational applications.

FIGS. 10A and 10B show the relation between inserted audio and control information and a reproduced audio output, which is the case where the group number of the SWS data in FIG. 9 is included in the control information. In FIGS. 10A and 10B, $S_0$–$S_2$ indicate the SWS data group numbers, $C_1$ a control signal indicative that a selected write in the memory is possible, $C_2$ sa control signal for performing an operation by which a continuous audio output is possible, $C_3$ a control signal for commencing readout from the memory.

In FIG. 10A, the audio information of a group number $S_1$ is selectively written into the memory and a continuous audio output is provided as in the case in FIG. 7A. that is, the disc player is operated in the usual reproduction mode and switched temporarily to the still mode for each occurence of a group Si except the first occurence, so that a continuous audio output is provided while images are displayed successively. If one readout time corresponds to the length of the frame (i+1), continuous sound may be provided for animation by feeding an image at the group Si instead of the still reproduction thereat.

In FIG. 10B, the audio information of the group Si is selectively written into the memory, and upon a completion of the writing operation, readout thereof is commenced. After the readout is completed, data of a next group $S_1$ is written into the memory. This operation is the same as shown in FIG. 9. In FIG. 10B, a symbol ( ) indicates that there is no need for player control when an audio output is provided for animation.

It should be noted, with regard to FIGS. 10A and 10B, that although the readout is commenced at the end of the group Si, regardless of any selection of $S_o$–$S_i$, it may be commenced immediately after the completion of the write-in operation. In the latter case, the control signal $C_3$ is unnecessary. The block position of the video format signal into which the SWS data is inserted may be any assigned by the control signal.

Although the selection of write in or readout of the SWS data is possible using the control information as mentioned, it may be controlled externally. That is, it is possible to employ computer control. For example, if the region of the time expansion memory into which the SWS data is written is distinguished according to group members, it is possible to change the group members of the input SWS suitably to clearly write in another region without erasing previous SWS data. Thus, by using the control signal as described, various desirable functions can be realized.

The above-described system is a universal type and requires a relatively sophisticated and expensive construction. In implementing this system, there may be a case where the construction should be simplified to reduce the cost, even if the function thereof may be restricted. For example, if the member of audio channels and the sampling frequency are fixed, there may be no need of using a control signal for controlling these parameters, or if the timing of readout of the SWS data from the time expansion memory is fixed at a time immediately after the write-in, there may be no need of a control signal for the commencement of the readout.

Further, the construction may be further simplified by restricting the operation of the player. For example, for an optical-type video disc player, by making the system such that the player operates usually in the still reproduction mode with the Philips code and transfers to the ordinary reproduction mode upon completion of the readout of the SWS data from the memory, there may be no need of providing control signals for these operations.

Figure 11A:
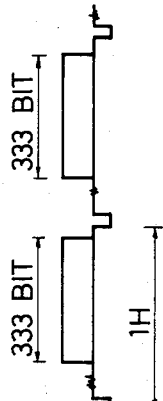
FIGS. 11A and 11B are signal waveform diagrams showing signals in another embodiment of the present invention.
Figure 11B:
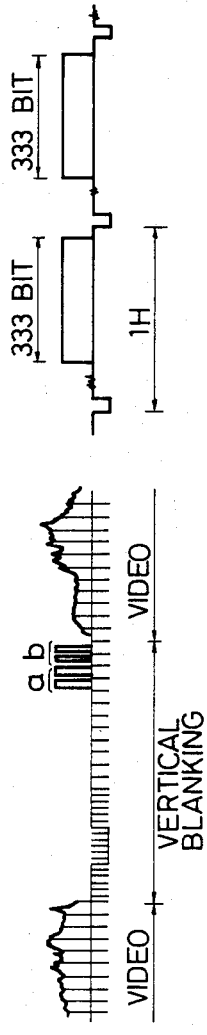

As an example, it is assumed that human voice is used as the audio information and it is encoded with an ADPCM d gital signal and that the video signal is processed at 40 K bits/second, that is, displayed as animation. In such a case, the transmission rate of the video signal may be 666 bits/field. This may be recorded in a vertical area in two horizontal scanning lines which are close to at area and not displayed on a monitor television screen. That is, as shown in FIG. 11, a data overlap of 333 bits is present in a horizontal scanning line. In FIG. 11A, a depicts a test signal and b an audio information. FIG. 11B shows these on an enlarged scale. In the case of a two-channel audio syste, the signal may be recorded in four horizontal scanning lines. In the case of musical information, the transmission rate should be less than that for human voice and thus the number of horizontal scanning lines in which the data is overlapped should be increased. In a case where a redundancy bit 1s to be added as an error correction code, the number of bits in one horizontal scanning line, or the number of horizontal scanning lines, may be increased. By so doing, it is possible to add audio information to animation without reducing the image area substantially.

Figure 12:
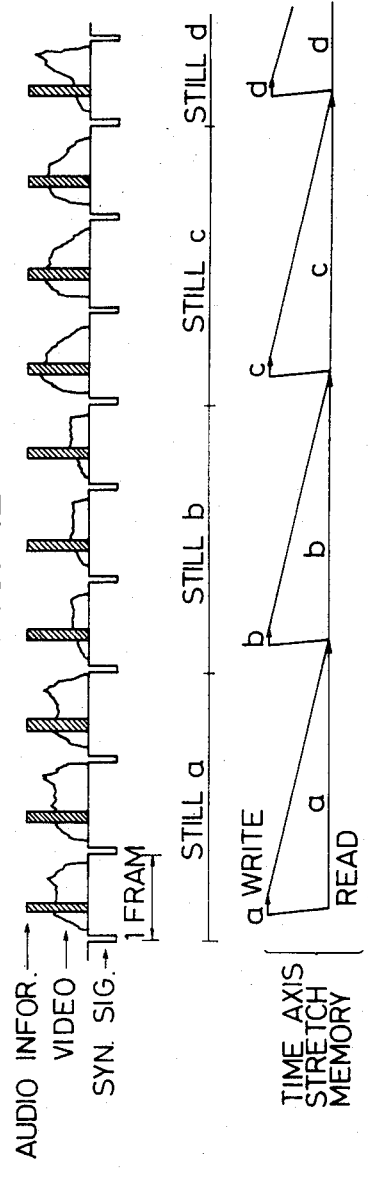
FIG. 12 is a graph illustrating a reproducing operation in another embodiment of the present invention.

An example where, for a continuous audio output, the capacity of the time expansion memory can be substantially reduced will be explained with reference to FIG. 12. It is assumed that the amount of audio information to be inserted into one frame (field) is made constant and corresponds to video information in a plurality of frames (fields) and that the location in the frame into which the audio information is inserted is fixed. Since the writing rate into the memory is smaller than the reading rate, information which is written into the memory will be read out if the readout is started immediately after the write-in operation as shown. Since audio information a, b, c, d . . . corresponds to three frames, the time at which the readout of each of these informations is started is always constant in every frame. Therefore, by setting an end time of readout of the information immediately before write in of the last data of the subsequent audio information and performing the reading-out operation even at a switching point to the audio information with same timing, the memory capacity is reduced to that corresponding to one of a, b, c, d . . . reduced by an information amount which is readout until the completion of the write-in of the respective audio informations. Practically, however, in order to accomodate jitter etc. of the reproduced signal and facilitate control, the memory should have a capacity corresponding the amount of audio information in one frame. The number of frames corresponding to eacn audio information data segment may be an arbitrary integer and, for one frame, corresponds to animation.

Error correction of the control information will now be described. The control information is divided, as a digital data, into a block a constant length, and a redundancy bit in BCH code is added to each block so that error bits can be corrected block by block. The digital data in each block to which the redundancy bit is added is frequency or phase modulated. FIG. 13A shows a case where the data is phase-modulated, and in which the digital data rises at a center of a bit cell when it is "1" state and falls when it is "0" state.

Figures 13B, 14:
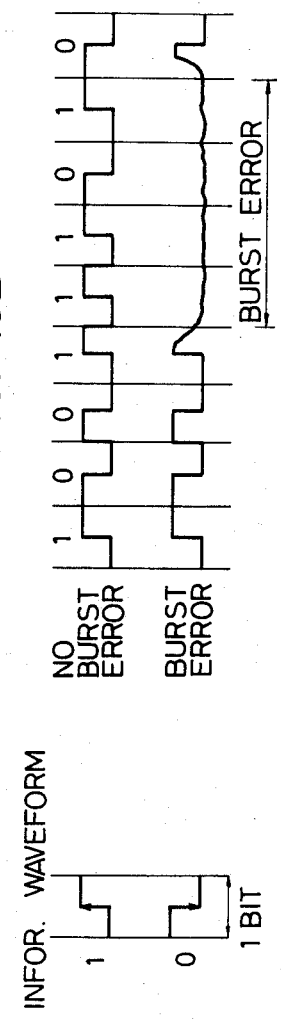

For a case of burst error as shown in FIG. 13B, which is a continuous error caused by signal dropout etc. and which cannot be corrected with only a redundancy bit in BCH code, a breakage or the regular reverse of states is detected as an error pointer of that block, including the burst error. On the other hand, a parity bit C, obtained from two successive (A and B, FIG. 14) of the blocks to each of which the redundancy bit is added, is added as a redundancy bit. The parity bit C can be represented as $C_i = A_i + B_i$, where i is a positive integer including 0 and + represents modulo two addition. Thus, the burst error is corrected by using the parity bit C and the error pointer. The error pointer may be produced when the number of the bit cells in one block where there is no rising-up or going-down reverse at the centers thereof becomes larger than the number of bits which can be connected by the BCH code.

Figure 15:
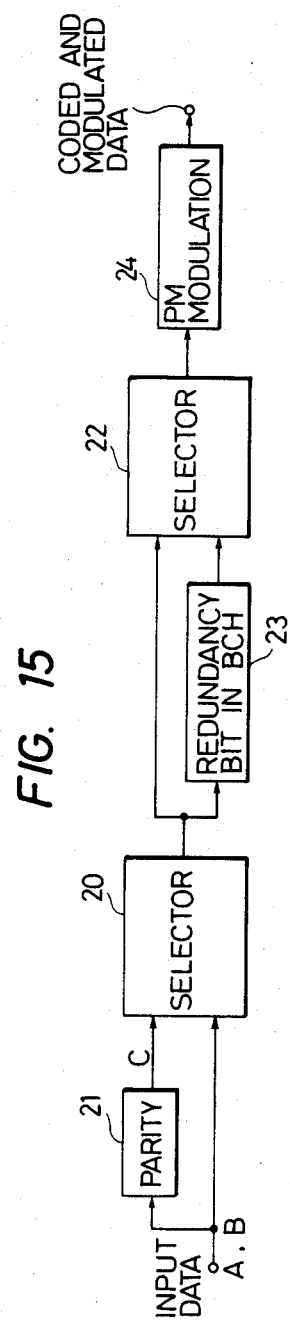
FIG. 15 is a block diagram of an apparatus used for performing modulation of control information and error correction coding.

FIG. 15 shows in block diagram form a system for performing phase modulation and error correction coding as indicated in FIGS. 13 and 14. In FIG. 15, the input data A and B is fed to a selector 20, and also a parity bit. The selector 20 outputs first the input data A and B and then the parity bit C. The output of the selecter 20 is supplied to a selecter 22 and a BCH code redundancy bit forming circuit 23 in which redundancy bits are formed for A, B and C, respectively. The selecter 22 provides the data A, the redundancy bit for the data A, the data B, the redundancy bit for the data B, the parity bit C and the redundancy bit for the parity bit C, in the specified order. The output from the selecter 22 (FIG. 14) is phase modulated by a PM modulator 24. It should be noted that instead of a parity code for burst error correction, it may be possible to use b adjacent codes.

Figure 16:
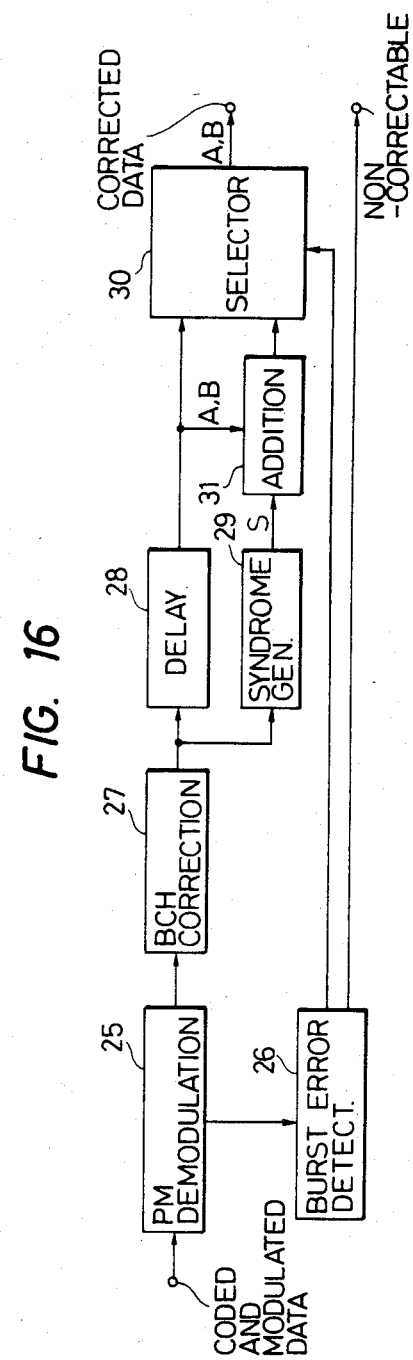
FIG. 16 is a block circuit diagram of an apparatus used for performing demodulation of control information and error correction.

FIG. 16 shows, in block diagram form, a system for demodulating the error-correction coded and PM modulated data and correcting errors therein. The data supplied is demodulated by a PM demodulator 25, and at the same time, the respective blocks A, B and C are checked for burst error by a burst error detector 26. The demodulated data in each of the blocks A, B and C is corrected for bit error by a corrector 27 using BHC code. The data thus corrected is fed to a delay circuit 28 and a data group forming circuit 29 in which a group $S = A + B + C$ is formed. The delay circuit 28 delays the data so that first data A is inputted to a selector 30 at the time when the formation of the group S is complete. An adder circuit 31 performs modulo-two addition of the group S and the respective data. If the block B contains a burst error, represented by $B' = B + e$, the modulo-two addition performed by the adder 31 becomes:

$$S + B' = B + e + A + B + e + C$$
$$= B$$
$$(\because B = A + C)$$

and thus the output of the adder 31 contains burst-error corrected data.

If either of the data A or B includes a burst error and the parity bit C is plus ("1"), the selector 30 selects the output of the adder 31 so that it always provides correct data at its output. The selector 30 is controlled by an output of the burst error detector 26. Since error correction is impossible when at least two of the blocks A, B and C include burst errors, the detector 26 provides a flag showing non-correctability. Since the parity bit C is used only for correction, and therefore there is no need of outputting it, error correction for the parity bit C itself is not performed.

The burst error detector 26 is composed of a gate, a counter and latches, etc., and the BHC corrector 27 and the data group forming circuit may be composed of gates, shift registers, exclusive-OR gates, ROMs, etc., and the delay circuit may be composed of shift register and latches, etc.

Figure 17:
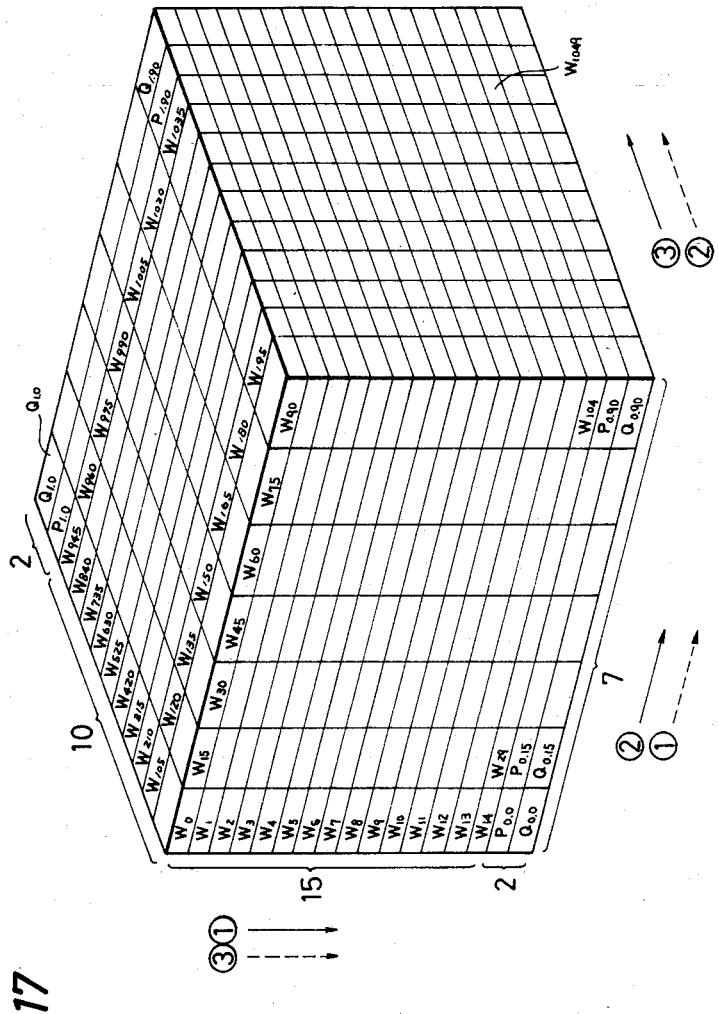
FIGS. 17 and 18 are conceptual diagrams illustrating interleaving of error correction with audio information.

The error correction system for audio information will be described with reference to an example when m and n in FIG. 1 are 1 and 14, respectively. It is assumed that the audio information in each block includes 1050 sampling data points, each represented by $W_i$ (i=0 to 1049), and that each of the samples $W_i$ is compped of four bits. It is further assumed that the suffix i indicates the order of the samples which conceptually are arranged in the three-dimensional form shown in FIG. 17. In FIG. 17, the numbers beside solid arrows show the sampling order and the numbers beside dashed arrows show the insertion order in the video format signal.

More specifically, after 15 samples (from $W_0$ at an upper left corner of the three-dimensional array to $W_{14}$) have been received in order, the redundant parity bits $P_{0,0}$ and $Q_{0,0}$ for b adjacent code values are added thereto for error correction. Then, after 15 samples $W_{15}$ to $W_{29}$, $P_{0,15}$ and $Q_{0,15}$ are added. In a similar manner, $P_{0,90}$ and $Q_{0,90}$ are added after 15 samples ($W_{90}$ to $W_{104}$). Then, after 15 samples ($W_{105}$ to $W_{119}$), $P_{0,105}$ and $Q_{0,105}$ are added. This is repeated until $P_{0,1035}$ and $Q_{0,1035}$ are added after samples $W_{1035}$ to $W_{1049}$. $P_{0,j}$ and $Q_{0,j}$ (j=0, 15, 30, 45, . . . , 1035) thus added are used as parity bits in the vertical direction (along the solid arrow 1) of the three-dimensional arrangement.

Figure 18:
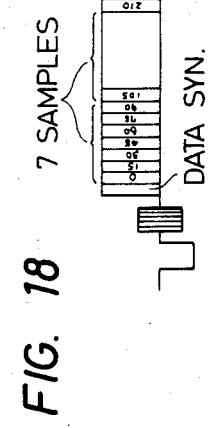

Then, for parity bits in the lateral direction (along the solid arrow 3), $P_{1,1s}$ and $Q_{1,k}$ are formed. For example, $P_{1,0}$ and $Q_{1,0}$ are parity bits for 10 samples $W_0$, $W_{105}$, $W_{210}$, . . . $W_{945}$. In a similar manner, $P_{1,90}$ and $Q_{1,90}$ are added after 10 samples ($W_{90}$ to $W_{1035}$). The audio information in one block, which includes the error correction code thus obtained, is interleaved and rearranged, and it is inserted into a region corresponding to 17 horizontal scanning lines in one field of the video format signal. FIG. 18 shows a sample arrangement in the first horizontal scanning line into which interleaved data is inserted. In FIG. 18, on the top portion subsequent to a color burst signal a data synchronizing signal is overlapped, and immediately thereafter, 12 sets, each including seven samples, are arranged in order. The arrangement (interleaved) in this case follows the dotted arrows in FIG. 17.

With this arrangement, the parity bits $P_{1,0}$ and $Q_{1,0}$ become error correcting codes for respective samples $W_0$, $W_{105}$, $W_{210}$ . . . $W_{945}$ on the same horizontal scanning line. Generally, the parity bits $P_{1,k}$ and $Q_{1,k}$ (k=0, 1, . . . 14; $P_{0,0}$, 15, . . . , 29, $P_{0,15}$, $Q_{0,15}$, 30, . . . , 104, $P_{0,90}$, $Q_{0,90}$) become error correcting codes for ten samples arrangeded randomly in one horizontal scanning line.

During reproduction, error correction of the ten samples randomly arranged on one horizontal scanning line is performed by using $P_{1,i}$ and $Q_{1,i}$ thus obtained, and in addition thereto, error correction for 15 samples such as $W_0$ to $W_{14}$ arranged randomly on different horizontal scanning lines is performed using $P_{0,0}$ and $Q_{0,0}$.

The error correction code, made up of b adjacent code values, is used to correct adjacent error of b=4 bits. That is, it can be used to correct up to four erroneous bits in one sample. Parity bits $P_{0,j}$ and $Q_{0,j}$ ($j=0, 15, \ldots 111\ 1035$) are formed as follows:

$P_{0,0} = W_0 + W_1 + \ldots + W_{14}$
$P_{0,15} = W_{15} + W_{16} + \ldots + W_{29}$
.
.
.
$P_{0,1035} = W_{1035} + W_{1036} + \ldots + W_{1049}$
$Q_{0,0} = T^{14} \cdot W_0 + T^{13} \cdot W_1 + \ldots + T \cdot W_{13} + W_{14}$
$Q_{0,15} = T^{14} \cdot W_{15} + T^{13} \cdot W_{16} + \ldots + T \cdot W_{28} + W_{29}$
.
.
.
$Q_{0,1035} = T^{14} \cdot W_{1035} + T^{13} \cdot W_{1036} + \ldots + T \cdot W_{1048} + W_{1049}$ Where each of P, Q and W is a line vector of 4 bits, + indicates modulo two addition, and T is as follow:

$$T = \begin{bmatrix} 0001 \\ 1001 \\ 0100 \\ 0010 \end{bmatrix}$$

Assuming that an error is included in $W_0$-$W_{14}$, it is corrected by $P_{0,0}$ and $Q_{0,0}$. For example, when $W_e$ includes an error e and is expressed by $W' = W + e$, where e is an error pattern, $S_{0,p}$ and $S_{0,Q}$ are:

$S_{0,p} = P_{0,0} + W_0 + W_1 + \ldots + W'_l + \ldots + W_{14} = e_l$ $S_{0,Q} = Q_{0,0} + T^{14} \cdot W_0 + T^{13} \cdot W_1 + \ldots + T^{14-l} \cdot W'_l + \ldots + W_{14} = T^{14-l} \cdot e_l$ $T^{l+1} \cdot S_{0,Q} = T^{15} \cdot e_l = e_l = S_{0,p}$ $(\because T^{15} = 1)$ That is, $S_{0,Q}$ is multiplied with T ($+1$) times so that $S_{0,Q} = S_{0,P}$ is established and a sample position is derived from ($+1$). W' is corrected by thus obtained.

The data group $S_{o,p}$ and $S_{0,Q}$ can be expressed by using the parity check matrix H as follow:

$$S = \begin{pmatrix} S_{0,P} \\ S_{0,Q} \end{pmatrix} = H \cdot W = \begin{pmatrix} 1 & 1 & \ldots & 1 & 1 & 0 \\ T^{14} & T^{13} & \ldots & T & 1 & 0 & 1 \end{pmatrix} \begin{pmatrix} W_0 \\ W_1 \\ \vdots \\ W_{14} \\ P_{0,0} \\ Q_{0,0} \end{pmatrix}$$

where is unit matrix of $4 \times 4$.

In the similar manner, parity bits $P_{1,k}$ and $Q_{1,k}$ are obtained as follows:

$P_{1,0}\ W_0 + W_{105} + \ldots + W_{945}$
$P_{1,1} = W_1 + W_{106} + \ldots + W_{946}$
.
.
.
$P_{1,14} = W_{14} + W_{119} + \ldots + W_{959}$
$P_{1,P0,0} = P_{0,0} + P_{0,105} + \ldots + P_{0,945}$
$P_{1,Q0,0} = Q_{0,0} + Q_{0,105} + \ldots + Q_{0,945}$
.
.
.
$Q_{1,0} = T^9 \cdot W_0 + T^8 \cdot W_{105} + \ldots + T \cdot W_{840} + W_{945}$
$Q_{1,1} = T^9 \cdot W_1 + T^8 \cdot W_{106} + \ldots + T \cdot W_{841} + W_{946}$ $Q_{1,14} = T^9 \cdot W_{14} + T^8 \cdot W_{119} + \ldots + T \cdot W_{854} + W_{959}$
$Q_{1,900} = T^9 \cdot P_{0,0} + T^8 \cdot P_{0,105} + \ldots + T \cdot P_{0,840} + P_{0,945}$
$Q_{1,Q00} = T^9 \cdot Q_{0,0} + T^8 \cdot Q_{0,105} + \ldots + T \cdot Q_{0,840} + Q_{0,945}$ The data group is expressed by the parity check matrix as follows:

$$S = \begin{pmatrix} S_{0,P} \\ S_{0,Q} \end{pmatrix} = H \cdot W = \begin{pmatrix} 1 & 1 & \ldots & 1 & 1 & 0 \\ T^9 T^8 & \ldots & T & 1 & 0 & 1 \end{pmatrix} \begin{pmatrix} W_0 \\ W_{105} \\ \vdots \\ W_{945} \\ P_{1,0} \\ Q_{1,0} \end{pmatrix}$$

When $W_m$ includes an error and becomes $W'_m = W_m + e_m$, $S_{1,p} = e_m,\ S_{1,Q} = T^{9-m} \cdot e_m$ $T^{m+6} \cdot S_{1,Q} = T^{15} \cdot e_m = e_m = S_{1,p}$ By obtaining m from the above, the correction is made along $W'_m + S_{1,p} = W_m + e_m + e_m = W_m$. That is, $W_i$, $P_{0,j}$ and $Q_{0,j}$ are corrected using $P_{0,j}$ and $O_{0,j}$. Alternately, it is possible to obtain error correction by detecting the error using $P_{1,k}$ and $Q_{1,k}$ and to correct errors of two samples using $P_{0,j}$ and $Q_{o,j}$.

Figure 19:
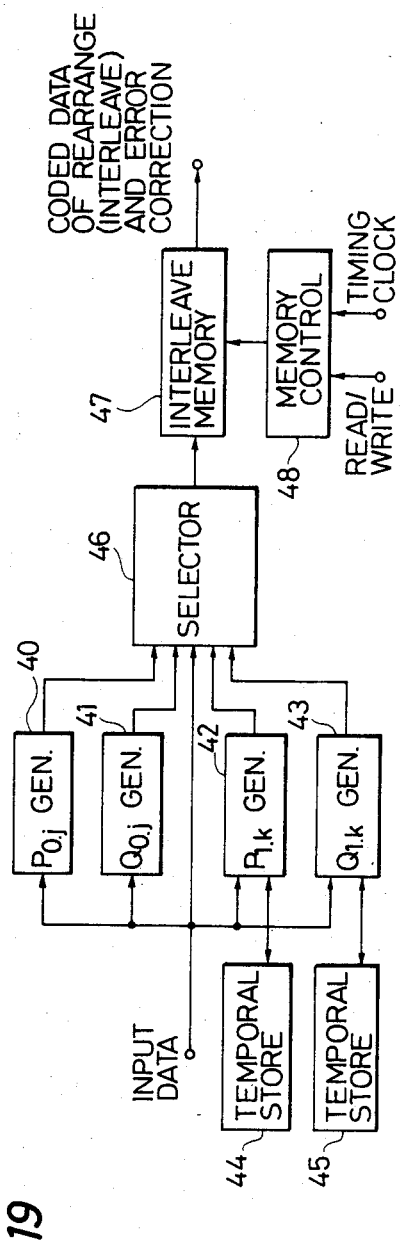
FIG. 19 is a block diagram of an apparatus used for performing interleaving and error correction coding of audio information.

FIG. 19 is a block diagram of a circuit for interleaving and error correction coding of a sampling data shown in FIG. 17. When data is supplied, the redundancy parity bits $P_{0,j}$ and $Q_{o,j}$ for performing error correction between different horizontal scanning lines and the redundancy parity bits $P_{1,k}$ and $Q_{1,k}$ for performing correction in one H are found in forming circuits 40 to 43, respectively. $P_{0,j}$ and $Q_{o,j}$ are formed every 15 samples of the data and $P_{1,k}$ and $Q_{1,k}$ are formed for data in the horizontal scanning line after the interleaved data. Therefore, it is necessary to provide memories 44 and 45 to temporarily store intermediate values of $P_{1,k}$ and $Q_{1,k}$. That is, $P_{1,0}$ and $Q_{1,0}$ are formed for $W_0$, $W_{105}$, ..., $W_{945}$. Since similar operations for, for example, samples $W_1$, $W_{106}$..., which are supplied during the formation of $P_{1,0}$ and $Q_{1,0}$ for $W_0$, $W_{105}$ ... etc., must be performed, intermediate calculated values of $P_{1,k}$ and $Q_{1,k}$, corresponding to the input data, are temporarily stored in the memories 44 and 45. The memories are then read out to start the calculation again, results of which are again written in these memories. This operation is repeated until $P_{1,k}$ and $Q_{1,k}$ are produced.

The input data and the redundant parity bits $P_{1,j}$, $Q_{1,j}$, $P_{1,k}$ and $Q_{1,k}$ are supplied to a selection circuit 46 and then to an interleave memory 47. The interleaving operation is performed in the memory 47 by exchanging the order of sample write in and read out. When time-axis compression is necessary, this same memory can also be used for that purpose. A memory control circuit 48 functions to generate various timing signals necessary for the memory by using the control signal for read/write operation and a timing clock signal.

The circuits 40 and 43 may be composed of shift registers and exclusive-OR gates, and the memory may be composed of registers and RAMs.

Figure 20:
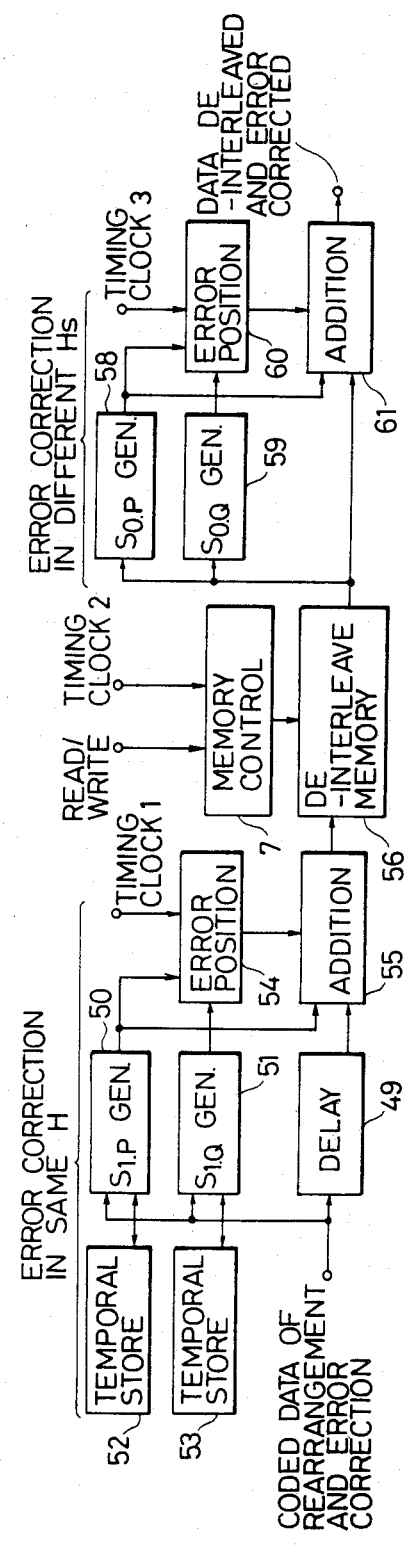
FIG. 20 is a block diagram of an apparatus used for performing the deinterleaving and error correction of audio information.

FIG. 20 is a block circuit diagram of a circuit used for interleaving and error correcting data produced by the circuit of FIG. 19. Reproduced input data is supplied to a delay circuit 49, data group forming circuits 50 and 51 for $S_{1,p}$ and $S_{1,Q0}$. $S_{1,p}$ and $S_{1,Q}$ are syndromes for error correction in one H and formed on the basis of the formular described previously. Since the data in the one H is interleaved, intermediate calculation values must be temporarily stored in memories 52 and 53, as in the case of the formation of $P_{1,k}$ and $Q_{1,k}$ in FIG. 19. With the groups $S_{1,p}$ and $S_{1,Q}$, sample positions at which there is an error are obtained by an error position detector 54. Since the group $S_{1,p}$ is a parity error, correction of the error sample can be performed by a modulo two addition of it to the error sample in an adder circuit 55. A timing clock signal synchronizes the data sample, and pulses of the clock signal counted by the error position detecting circuit 54 to generate an addition instruction which is applied to the adder 55 at the time the error sample is supplied to the adder.

The delay circuit 49 functions to delay the data such that the data group is formed prior to the supply of the data to the adder circuit 55.

The data which is error corrected in one horizontal scanning line is fed to a de-interleave memory 56 in which the write/read order is changed to de-interleave the data. It is also possible to perform time-axis expansion in this memory. The operation of the memory 56 is controlled by a memory control circuit 57. The de-interleave memory 56 performs a readout operation for formation of the groups $S_{0,p}$ and $S_{0,Q}$, firstly, and then a readout operation for correction of respective samples and formation of an output. For example, when the samples $W_0, W_1, \ldots W_{14}$ are to read out, $W_0, W_1, \ldots W_{14}, P_{0,0}$ and $Q_{0,0}$ are read out first to form the groups $S_{0,p}$ and $S_{0,q}$ by group forming circuits 58 and 59. Then, $W_0, W_1, \ldots W_{14}$ are read out again. At this time, the adder circuit 55 has no input. If, in this case, any of $W_0, W_1, \ldots W_{14}$ is erroneous, an addition instruction is supplied by an error position detecting circuit 60 on the basis of the groups $S_{0,p}$ and $S_{0,0}$ and a timing clock 3. In an adder circuit 61, group $S_{0,p}$ and the error sample are added (module two) to correct the latter sample. With these circuits 58–61, the error correction is thus performed between different horizontal scanning line.

Since the error correction circuits associated with the de-interleave memory 56, i.e., the error correction circuits for one horizontal scanning line, operates fundamentally in the same manner as that for different scanning lines, the correction circuit may be used commonly for both purposes on time-sharing basis, if operational timings permit. FIG. 20 shows an example of such circuit. Of course, other circuit constructions may be used as well.

For example, it is possible to connect the error correction circuit for one horizontal scanning line to the output of the de-interleave memory 56 in parallel with the other correction circuits. In such a case, the formation of the groups $S_{1,p}$ and $S_{1,Q}$ and the addition operation are performed upon the readout of the de-interleave memory, and therefore there may be no need of providing the memories 52 and 53 and the delay circuit 49.

Figure 21:
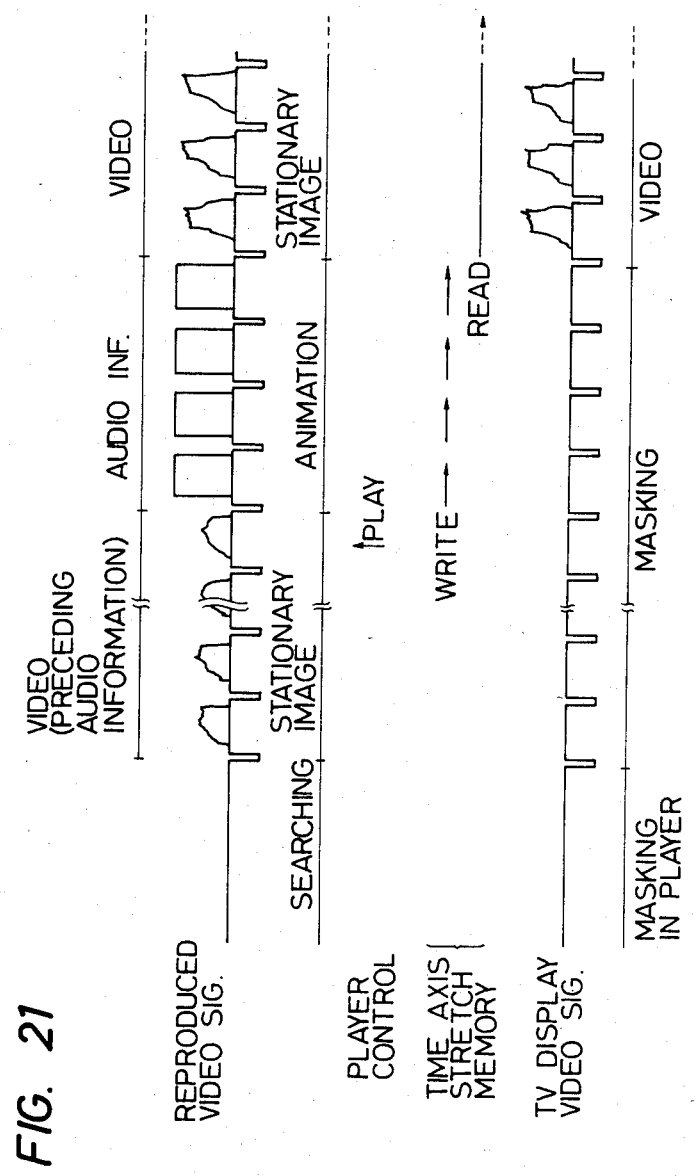
FIG. 21 illustrates a signal format for the search of video information.

FIG. 21 illustrates a search mode operation of the video disc player for the reproduction of the SWS data shown, for example, in FIG. 7B. When the reproduction system is set to the search mode, the pick-up of the player is controlled to perform rapid movement to a desired address number. (Since the verification operation for the address number during the search is well known, a detailed explanation is omitted.) During the search operation, there is no video signal output. When an address number preceding the desired address number is searched, rapid movement of the pick-up is stopped and the system is switched to the stationary image reproduction mode. If the decoder is synchronized with the video format signal causing the write-in of the audio information, the pick-up is switched to the normal reproduction mode, and, when it reaches a frame corresponding to the desired address number portion, the audio information is written into the memory in six frames. It may be possible, however, to employ selective write-in of the audio information as shown in FIG. 9.

Since the decoder is masked until it reaches the ninth frame in which audio information exists, even if the search operation is completed, the audio information, for example, may be masked too. Thus, the masking is continued to clamp at the black level. The masking of the image is removed at a time when the reproduction of six frames has been completed and a desired image displayed on the monitor TV screen. At the same time, the audio information written in the memory is outputted with time-axis expension. Therefore, the desired image is displayed on the monitor screen after the search in the same manner as for usual stationary reproduction, and the audio information corresponding thereto is outputted. A similar search is also possible for the continuous sound reproduction as shown in FIG. 7A, or the audio information (FIG. 7B) can be inserted into the block portion of the frame as shown in FIG. 7A. The masking of the frame or the replacement of the image may be performed only for the blocks having the audio information.

Figure 22:
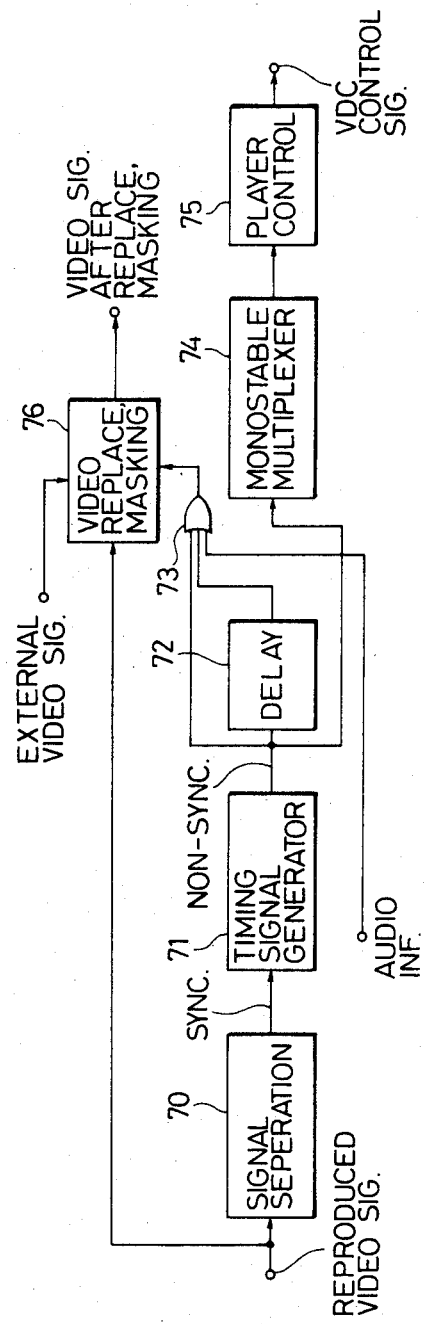
FIG. 22 is a block diagram of an apparatus used for performing the search of video information.

FIG. 22 is a block diagram of a control circuit for performing the search operation shown in FIG. 21. In FIG. 22, a reproduction signal from the VDP is supplied to a signal separation circuit 70 to separate the synchronizing signal therefrom, and the synchronizing signal is fed to a timing signal generator 71. An oscillator and a counter in the generator 71 operate in synchronization with the synchronizing signal to generate various timing signals after the search is completed and the video signal is supplied. An output of the timing signal generator 71 takes the state "1" when the oscillator and the counter therein are synchronized with the synchronizing signal, and "0" when these are not in synchronization. The output of the generator 71 and the output delayed by a delay circuit 72 are supplied to a three-input OR gate 73, whose output is supplied to a video replacement or masking circuit 76 for replacement or masking of the video signal during the search and immediately after the search. Since it is necessary to replace or mask the portion of the signal into which the audio information is inserted during the synchronization operation, a signal representative of a presence of audio information is supplied to one of the three-input OR gate. The output of the timing signal generator 71 is also supplied to a monostable multivibrator 74 so that the latter is triggered when the state of the output of the multivibrator 74 changes from "1" to "0", i.e., when synchronization is established, to actuate a player controller 75 to generate a signal by which the VDP is controlled to set it to the "play" state.

The delay circuit 72 provides a time delay equal to the time from the generation of the VDP control signal to establishment of reliable operation. When the VDP starts reproduction of a desired frame upon the "play" operation of the VDP, the replacement or masking of the video signal is terminated. Since there are audio information blocks, included in that frame, the replacement or masking for these blocks is continued.

As mentioned hereinbefore, according to the present invention, the audio information in blocks, together with control information, is inserted into arbitrary locations in an image to be processed according to a video format signal. Therefore, it is possible to record, on the same recording medium, the reproducing steps, i.e., the software, which is read out by the decoder (FIG. 5) to control the VDP. Thus, it is possible to realize various reproduction control without providing any special circuitry on the side of the VDP.

Further, since error correction is possible within the inserted audio and control information blocks, the reliability of the information when reproduced becomes very high.

Further, since it is possible to perform searches of the video format signal in the same manner as for a normal stationary image, there is no added distortion in the audio and video signals.

We claim:

1. A method for recording and reproducing a video format signal of the type having a plurality of successive line signal portions, with each line signal portion including a horizontal synchronizing signal portion followed by an information signal portion, said video format signal corresponding to a two-dimensional image and containing both audio and video information, said method comprising the steps of:

dividing said two-dimensional image into a plurality of blocks;

inserting audio information into information signal portions of said video format signal corresponding to predetermined ones of said plurality of blocks and inserting video information into information signal portions of said video format signal corresponding to remaining blocks;

recording said video format signal on a recording medium;

reproducing said video format signal from said recording medium, said reproducing step including one of the steps of (1) masking said information signal portions of said video format signal corresponding to said predetermined blocks so that no video information is displayed in the corresponding predetermined blocks of said two-dimensional image, and (2) replacing the audio information inserted into information signal portions of said video format signal corresponding to said predetermined blocks with video information to be displayed in the corresponding predetermined blocks of said two-dimensional image.

2. The method of claim 1, further comprising the step of inserting a control signal into an information signal portion of said video format signal to indicate correspondence between audio and video information.

3. The method claimed in claim 2, further comprising the steps of digitizing said audio and video information and control information prior to recording; and adding an error correction code to each portion of said video format signal into which audio and control information is inserted.

4. The method claimed in claim 3, further comprising the steps of grouping said predetermined blocks into a plurality of groups and assigning a group number to each of said groups, said group numbers being included in said control information.

5. The method claimed in claim 4, wherein said video information is in the form of animation information, and further comprising the step of time-axis compressing said audio information to a time length corresponding to one frame of said animation information prior to said recording step.

6. The method claimed in claim 5, further comprising the steps of, during reproduction of said video format signal: storing said time-axis-compressed audio information; and reading out said audio information as audio information on a real-time axis.

7. The method claimed in claim 6, further comprising the step of further storing an external audio input and reading out said stored external audio input in real time together with said audio information.

8. The method claimed in claim 7, wherein time-axis-compressed audio information inserted into one field or frame corresponds to video information in an integer number of fields or frames.

9. The method claimed in claim 8, further comprising the step of clamping to a predetermined signal level the portions of said video format signal corresponding to said predetermined blocks.

10. The method claimed in claim 9, wherein said reproducing step includes searching for a desired unit of video information, said method further comprising the steps of ending searching for said desired unit of video information at a frame just preceding said desired unit of video information; and terminating at least one of said masking and replacing steps upon reaching a portion of said video format signal corresponding to a frame of said two-dimensional image information containing said desired unit of video information.

* * * * *